June 6, 1972 G. L. WOOD ET AL 3,667,826
MERCHANDISE DISPLAY UNIT
Filed Nov. 20, 1970 5 Sheets-Sheet 1

INVENTORS.
Gerald L. Wood,
Harvey L. Kolster
BY James E. Zeller
ATTORNEYS 3,667,826
MERCHANDISE DISPLAY UNIT
Gerald L. Wood, Overland Park, Kans., Harvey L. Kolster, Grain Valley, Mo., and James E. Zeller, Beatrice, Nebr., assignors to Hallmark Cards, Incorporated, Kansas City, Mo.
Filed Nov. 20, 1970, Ser. No. 91,331
Int. Cl. A47f 3/14
U.S. Cl. 312—118    6 Claims

ABSTRACT OF THE DISCLOSURE

Units for displaying articles of merchandise are disclosed which each have knock-down back and base frames and a merchandise storage unit and merchandise display members for positioning articles of merchandise. Units having adjustable shelves, rotary spinners, sloping display panel with shelves thereon, stepped compartments, and vertically spaced bars with display members thereon are disclosed as exemplary of the inventive concept.

The present invention relates to display stands or racks and more particularly to merchandise display units having knock-down frames and a merchandise storage unit and merchandise display members.

The principal objects of the present invention are: to provide a simple, inexpensive structure to display article of merchandise which is constructed of a minimum of parts and which can be quickly assembled and disassembled; to provide such a merchandise display unit providing unique fixturing and signing which may be color coded to provide a quick and visual association with each of a plurality of major classification of articles; to provide such a merchandise display unit contributing to a dynamic merchandising system and store decoration wherein a large portion of each article may be display; to provide such a merchandise display unit which is expandible vertically and which includes lighting directed toward the articles of merchandise to enhance the visual impact thereof; to provide such a merchandise display unit having adjustable shelves for displaying the articles of merchandise; to provide such a merchandise display unit having a rotary spinner or revolving feature display unit having plastic pockets therein for displaying the full surface of generally flat articles of merchandise; to provide such a merchandise display unit which is rigid and strong and has a knock-down frame which may be readily assembled and disassembled without the use of tools; to provide such a merchandise display unit which is particularly adapted to display greeting cards, wrapping material including paper, ribbons, bows and the like, and party supplies including paper napkins, plates, cups, coasters and the like; and to provide such a merchandise display unit which is pleasing in appearance and formed of light, simple and inexpensive members, stable and durable in use, and particularly well adapted for the proposed use.

Other objects and advantages of this invention will become apparent from the following description taken in connection with the accompanying drawings wherein are set forth by way of illustration and example, certain embodiments of this invention.

Referring more in detail to the drawings:

As required, detailed embodiments of this invention are disclosed herein, however, it is to be understood that these embodiments are merely exemplary of the invention which may be embodied in many forms that are radically different from the illustrated embodiments presented herein. Therefore, specific structural and functional details disclosed herein are not to be interpreted as limiting, but merely as a basis for the claims actually defining the scope of this invention. In this regard, it is to be recognized that merchandise display units in accordance herewith may be embodied in various forms including adjustable shelves, hangers, drawers, rotary spinners, stepped compartments and the like, and furthermore that such structures may present various portions and views of articles of merchandise to the public, however, the disclosure herein is presented only as a representative basis for teaching one skilled in the art to variously employ the present invention in virtually any appropriate detailed structure.

Figure 1:
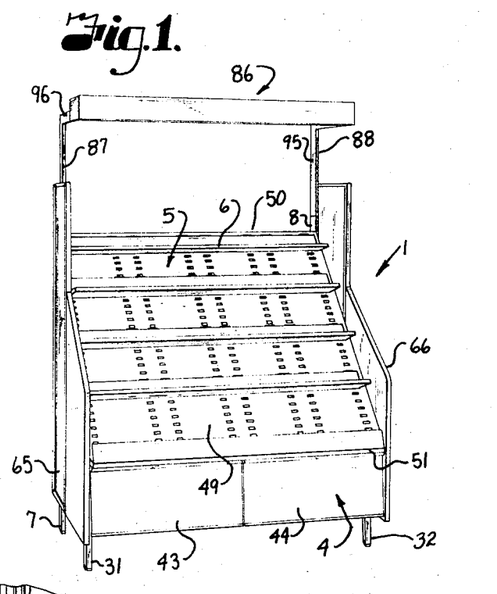
FIG. 1 is a perspective view of a merchandise display unit embodying features of the present invention.

The reference numeral 1 generally designates a merchandise display unit having members and portions for storing and displaying articles of merchandise, such as greeting cards, gift wrapping material, party supplies and the like. The merchandise display unit 1 has a back frame 2 and a base frame 3 for supporting a merchandise storage unit 4 and merchandise display means 5 having a plurality of vertically spaced merchandise supporting members 6.

Figures 4, 5:
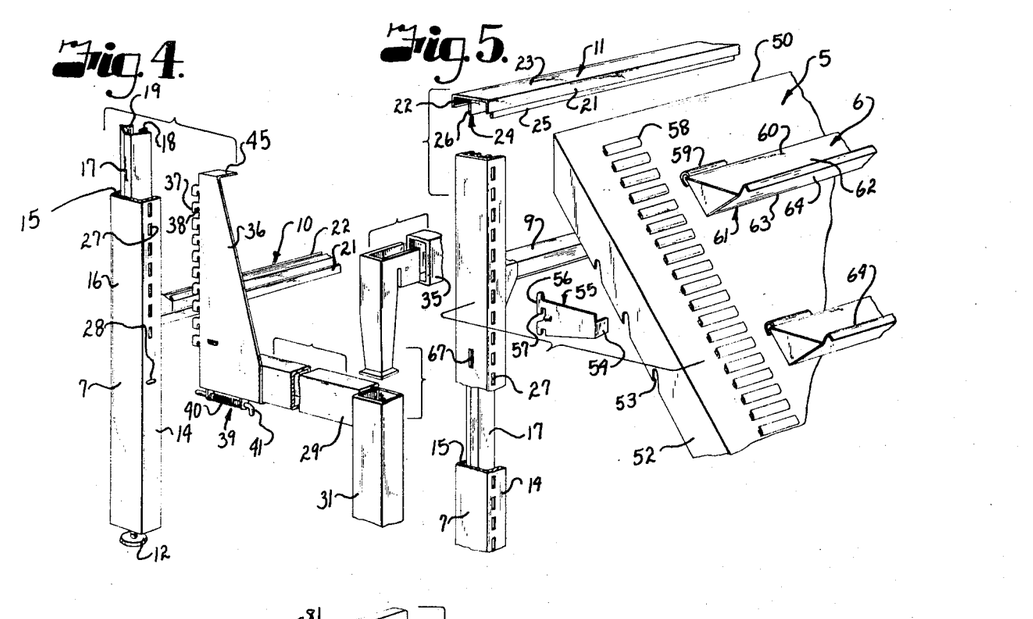
FIG. 4 is an enlarged fragmentary exploded perspective view of members forming a back frame and base frame for the merchandise display unit.
FIG. 5 is an enlarged fragmentary exploded perspective view of the back frame and a display panel and shelves to be mounted thereon.

The back frame 2 includes a pair of laterally spaced substantially parallel upright standards 7 and 8 which support opposite ends of vertically spaced upper and lower rails 9 and 10 respectively extending between and having opposite ends suitably supported on facing surfaces of the standards 7 and 8 to define the back frame 2. A top cap 11 is mounted on upper ends of the standards 7 and 8 to provide a completed or finished appearance to the back frame 2.

The standards 7 and 8 each have levelling means 12 mounted on a lower end thereof and engageable with a floor surface 13 for supporting the standards thereon. Each leveling means 12 is operative to adjust the position of the respective standards 7 and 8 vertically to thereby position the upper and lower rails 9 and 10 substantially level and horizontal.

The standards 7 and 8 may be formed in any desired shape to provide support for the base frame 3, merchandise support unit 4, and merchandise display means 5. However, the standards 7 and 8 are illustrated as channel-shaped members each having spaced flange portions 14 and 15 connected by a web portion 16 extending therebetween.

Each of the standards 7 and 8 has an interior channel 17 having flange portions 18 and 19 spaced from interior faces of the flange portions 14 and 15 respectively of the standards 7 and 8 to define respective spaces therebetween for receiving side edge portions of a closure panel 20 mounted in the back frame 2 for providing a finished appearance for the merchandise display unit 1.

The upper and lower rails 9 and 10 and the top cap 11 may also be formed in any desired shape to connect to the standards 7 and 8 and to receive and support respective edge portions of the closure panel 20. However, the rails 9 and 10 and top cap 11 are illustrated as channel-shaped members each having flange portions 21 and 22 extending from opposite edges of a web portion 23. An interior channel 24 is suitably secured within the lower rail 10 and the top cap 11 and the interior channel 24 has flange portions 25 and 26 spaced from the flange portions 21 and 22 to define respective spaces for receiving upper and lower edge portions of the closure panel 20.

The upper rail 9 has the flange portions 21 and 22 thereof positioned to be cleared by the closure panel 20 and provide support for an intermediate portion thereof.

Each flange portion 14 and 15 of the standards 7 and 8 has a plurality of vertically spaced slots 27 and a lower slot 28 for supporting the base frame 3 and various members of the merchandise display unit 1, as later described.

The base frame 3 includes arm and leg structures joined together with a support rail and in the illustrated structure, said base frame includes spaced parallel arms 29 and 30 each having one end supported on the standards 7 and 8 respectively to extend therefrom and generally forwardly from the back frame 2. The arms 29 and 30 have legs 31 and 32 respectively depending from a free end thereof and each leg 31 and 32 has leveling means 33, similar to the leveling means 12 for cooperation therewith, to effect leveling of the base frame 3. The legs 31 and 32 may be formed in any desired shape, however, the legs 31 and 32 are illustrated as tubular members having open upper ends to receive therein respective end portions of a support rail 35 extending therebetween and cooperating with the legs 31 and 32 and the arms 29 and 30 to define the base frame 3 which extends transversely from the back frame 2. The end portions of the support rail 35 are also tubular members and have open upper ends for receiving a member therein, as later described.

In the illustrated structure, the arms 29 and 30 each have a gusset 36 suitably secured to one end thereof for supporting engagement on the standards 7 and 8. The gusset 36 has a plurality of vertically spaced hooks 37 along one edge thereof with the hooks 37 each having a hook portion 38 depending therefrom and adapted to be received in the slots 27 in the flange portions 14 and 15 of the standards 7 and 8. The hook portions 38 are spaced from the edge of the gusset 36 a distance substantially equal to the thickness of the respective flange portion to thereby engage opposite faces of the respective flange portion of the standard between the hook portion 38 and the edge of the gusset 36 thereby substantially preventing relative movement between the back frame 2 and the base frame 3.

Each of the arms 29 and 30 has a resiliently mounted pin 39 positioned below the gusset 36 and having a suitable resilient member, such as a spring 40, urging one end of the pin 39 into the lower slot 28 of the respective standard for cooperating with the gusset 36 to rigidly connect and support the arms 29 and 30 on the respective standards 7 and 8. The illustrated pin 39 has a handle portion 41 depending therefrom to permit the pin 39 to be disengaged from the lower slot 28 when it is desired to knock-down or disassemble the back frame 2 and base frame 3.

Figure 3:
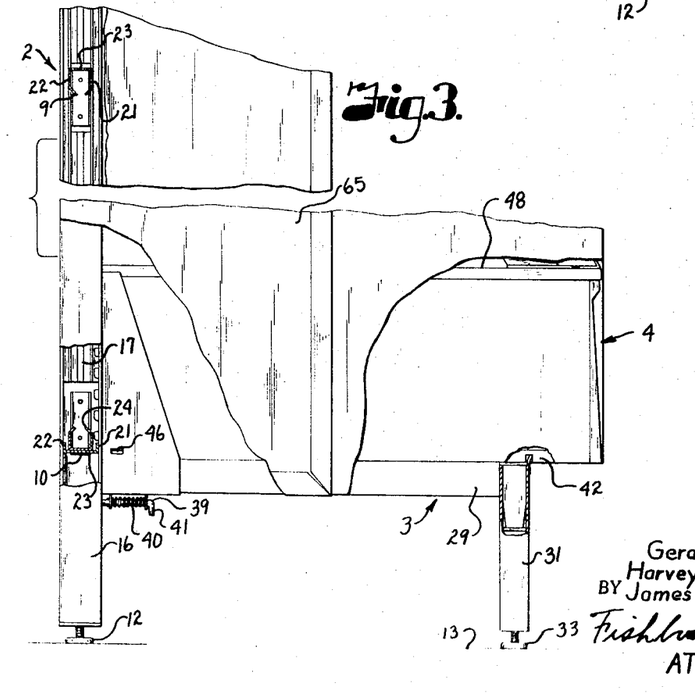
FIG. 3 is an enlarged fragmentary side elevational view with portions broken away to show installation and construction of a merchandise storage unit.

The mechandise storage unit 4 is illustrated as including a base or frame portion 42 and a pair of drawers 43 and 44 slidably mounted within the base or frame portion 42 for containing articles of merchandise. The base or frame portion 42 is supported on the base frame 3 and held in position against relative movement therebetween.

In the illustrated structure, the gusset 36 has a top flange 45 and a tap 46 extending from one side thereof to be received in suitable grooves in an end surface of the frame portion 42 or the top flange 45 may be engaged by an upper edge of the frame portion 42 while the tab 46 is received within a suitable groove in the frame portion 42.

The support rail 35 has a plurality of longitudinally spaced tabs 47 extending upwardly therefrom to be received within suitable grooves in a lower surface of the base or frame portion 42 to thereby cooperate with the top flange 45 and the tab 46 of the gussets 36 in positioning the frame portion 42 of the merchandise storage unit 4 in a substantially fixed position on the base frame 3.

Figure 2:
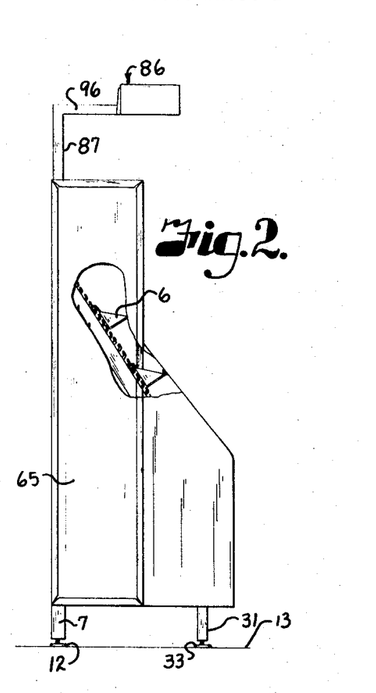
FIG. 2 is a side elevational view of the merchandise display unit with portions broken away to show a display panel with shelves mounted thereon.

A generally planar cover member 48 is placed on the frame or base portion 42 of the merchandise storage unit 4 to close same and provide support for the merchandise display means 5 which is illustrated as a sloping display panel 49 having an upper end 50 thereof supported on the back frame 2, as later described, and a lower end 51 engaging a forward portion of the cover member 48.

The illustrated display panel 49 has a depending flange 52 at each opposite side edge thereof and extending between the upper and lower ends 50 and 51 thereof. Each edge flange 52 has a plurality of spaced notches 53 formed therein to receive a flange or arm portion 54 of a support bracket 55 removably supported on the respective standards 7 and 8. Each support bracket 55 has a pair of hooks 56 each having hook portions 57 received in respective slots 27 in the standards 7 and 8 to thereby support the upper portion of the display panel 49 on the back frame 2.

The display panel 49 has a plurality of vertically aligned and spaced tabs 58 arranged in a plurality of laterally spaced rows. The tabs 58 each have a portion substantially parallel with an exposed surface of the display panel 49 to provide support for the merchandise supporting members 6. In the illustrated structure, the tabs 58 are positioned to be engaged by a respective hook portion 59 mounted adjacent an upper edge 60 of a respective one of a plurality of shelves 61 to support same in vertically stepped relation on the display panel 49.

Each of the shelves 61 has a back portion 62 which is engageable with the tabs 58 adjacent a lower edge 63 of the back portion 62 to provide support for the respective shelves. Each of the shelves 61 has a merchandise supporting portion 64 extending outwardly from the lower edge of the back portion 62 and substantially normal to the display panel 49 thereby providing support for display of articles of merchandise, such as books, albums, greeting cards, candles, wrapping paper, ribbons and the like.

End members 65 and 66 at opposite ends respectively of the merchandise display unit 1 provide a finished appearance for the unit and may have suitably colored or finished panels mounted therein to provide a code to designate the characteristics of the merchandise displayed in the unit 1. In the illustrated structure, the standards 7 and 8 each have a plurality of vertically spaced slots 67 in the web portion 16 thereof to receive suitable hooks extending from the end members 65 and 66 whereby the respective end members have a portion thereof mounted on the respective standard. The end members 65 and 66 each have a clip extending therefrom and engageable with the arms 29 and 30 of the base frame 3 whereby the end members each have a portion thereof supported on the base frame 3.

Figures 6, 7, 8:
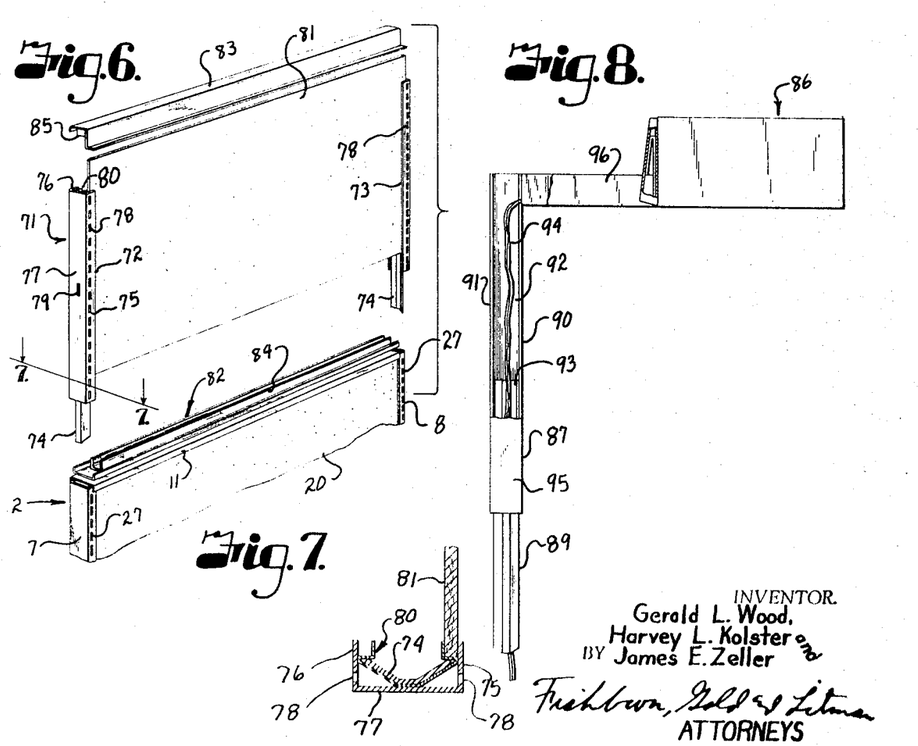
FIG. 6 is an enlarged fragmentary exploded perspective view of members forming an upper extension of the back frame of the merchandise display unit.
FIG. 7 is a transverse sectional view taken on line 7—7, FIG. 6, showing the construction of an extension standard.
FIG. 8 is a side elevational view of members forming an upper extension of the back frame and means for illuminating articles of merchandise on the display unit.

FIG. 6 illustrates frame 71 mounted on the back frame 2 and extending upwardly therefrom to provide additional display area or background area for the display of articles of merchandise. The extension frame 71 includes a pair of laterally spaced extension standards 72 and 73 mounted on the upright standards 7 and 8 respectively and extending upwardly therefrom and aligned therewith. The illustrated extension standards 72 and 73 each have a spline portion 74 mounted therein and extending from a lower end thereof to be received within the respective interior channel 17 of the respective standards 7 and 8. The extension standards 72 and 73 are constructed similar to the standards 7 and 8 and have opposed flange portions 75 and 76 connected by a web portion 77 extending therebetween.

The flange portions 75 and 76 of the extension standards 72 and 73 each have a plurality of vertically spaced and aligned slots 78 to receive hooks for supporting various members, as later described. Each web portion 77 of the extension standards 72 and 73 has at least one slot 79 therein to receive tabs extending from the end members 65 and 66 for supporting same on the extension frame.

The extension standards 72 and 73 each have an interior channel 80 mounted therein and having flange portions spaced from the flange portions 75 and 76 to define respective spaces therebetween to receive respective side edge portions of a closure panel 81 therein.

The extension frame 71 includes a bottom cap 82 and a top cap 83 in vertically spaced relation and having interior channels 84 and 85 respectively each having flange portions spaced from respective flange portions of the bottom cap 82 and top cap 83 to define respective spaces therebetween to receive respective top and bottom edge portions of the closure panel 81.

The bottom cap 82 of the extension frame 71 is moved into engagement with the top cap 11 of the back frame 2 thereby presenting a completed or finished appearance of the merchandise display unit 1 when the extension frame 71 and closure panel 81 is mounted thereon.

FIG. 8 illustrates a lighting unit 86 for mounting on the merchandise display unit 1 and extending upwardly from the back frame 2 thereof to provide illumination for articles of merchandise.

The lighting unit 86 includes a pair of laterally spaced extension standards 87 and 88 mounted on the upright standards 7 and 8 respectively and extending upwardly therefrom and aligned therewith. The illustrated extension standards 87 and 88 each have a spline portion 89 mounted therein and extending from a lower end thereof to be received within the respective interior channel 17 of the respective standards 7 and 8. The extension standards 87 and 88 are constructed similar to the standards 7 and 8 and have oposed flange portions 90 and 91 connected by a web portion 92 extending therebetween.

The extension standards 87 and 88 each have an interior channel 93 mounted therein to increase the rigidity thereof and define a path for a suitable electrical conductor 94. A cover member 95 is suitably secured to the free ends of the flange portions 90 and 91 of the extension standards 87 and 88 to enclose the electrical conductor 94 and provide a finished appearance for the extension standards 87 and 88.

The lighting unit 86 includes a pair of spaced parallel arms 86 each having one end supported on the standards 87 and 88 respectively to extend therefrom and normal to the back frame 2. The light support arms 96 provide means for supporting suitable illuminating means extending between the light support arms 96 and above the merchandise display means 5 for illuminating articles of merchandise in the merchandise display means 6.

Figures 9, 10, 11, 12, 13:
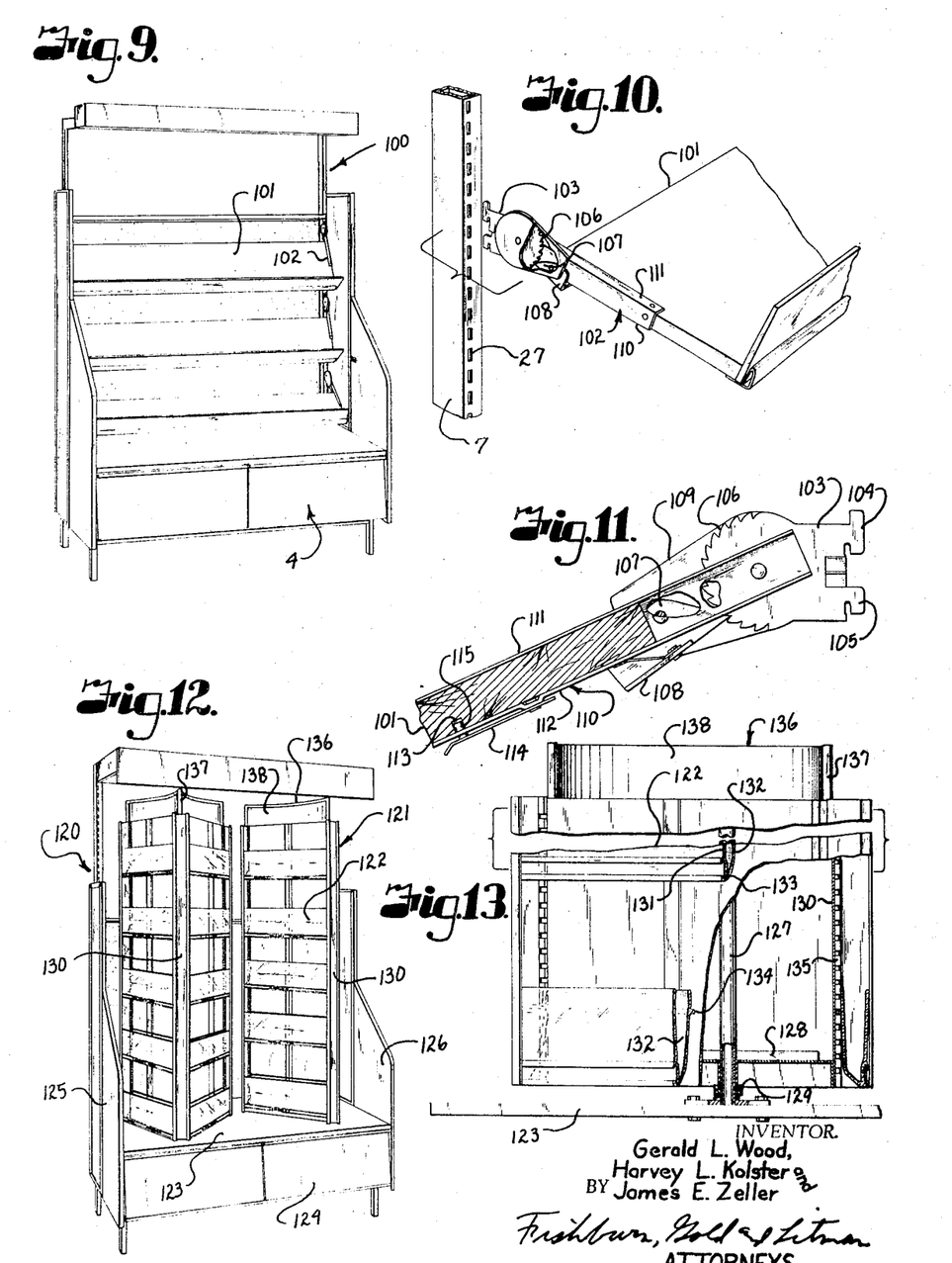
FIG. 9 is a perspective view of a modified merchandise display unit having adjustable display shelves.
FIG. 10 is an enlarged fragmentary exploded perspective view of an adjustable shelf bracket for supporting respective shelves of the modified display unit.
FIG. 11 is an enlarged side elevational view of the adjustable shelf bracket.
FIG. 12 is a perspective view of a further modified merchandise display unit having a plurality of rotatable spinners.
FIG. 13 is an enlarged fragmentary side elevational view of one of the rotatable spinners with portions broken away to better illustrate the component parts thereof.

FIG. 9 illustrates a modified merchandise display unit 100 having a plurality of adjustable display shelves 101 supported on the back frame 2, a later described, and a merchandise storage unit 4 supported on the base frame 3.

The adjustable display shelves 101 each have opposite ends thereof supported on a respective pair of parallel shelf brackets 102 each having a mounting portion 103 supported on the standards 7 and 8. The illustrated mounting portion 103 has vertically spaced hooks 104 and 105 adapted to extend through respective slots 27 in respective standards 7 and 8 for support on the back frame 2.

An outer periphery of the mounting portion 103 has a plurality of spaced teeth 106 to receive a suitable pivotally mounted pawl or dog 107 for holding the shelf bracket 102 in a selected adjusted position. The pawl or dog 107 is resiliently urged into engagement with the teeth 106 as by a suitable spring mounted on a release lever 108.

The pawl or dog 107 and the release lever 108 are positioned between a cover member 109 mounted on one side of the mounting portion 103 and an arm mounted on the other side of the mounting portion 103 and extending therefrom for retaining the pawl 107 and the lever 108 therebetween and thereby selectively position the arm 110 in one of a plurality of radially spaced positions arranged in a circular pattern having the center thereof within the mounting portion 103.

In the illustrated structure, each arm 110 is a channel shaped member having upper and lower flanges 111 and 112 respectively spaced apart to receive a respective end of the shelves 101 therebetween. Each of the arms 110 has an aperture 113 in one of the flanges thereof, preferably the lower flange 112, and a pivotally mounted retaining member 114 also preferably mounted on the lower flange 112.

The retaining member 114 is preferably formed of suitable resilient material, such as spring steel, and has a projection 115 extending from adjacent one ends thereof and the retaining member 114 is movable to align the projection 115 with the aperture 113 in the lower flange 112 whereby the projection 115 may be received within a suitable recess adjacent each end of the shelves 101 to thereby removably support each of the shelves 101 on a respective pair of the arms 110.

FIG. 12 illustrates a further modified merchandise display unit 120 having a plurality of rotatable spinners or revolving feature display units 121 having plastic pockets 122 therein for displaying the full surface of generally flat articles of merchandise, such as greeting cards and the like.

The further modified merchandise display unit 120 includes a generally planar cover member 123 above a merchandise storage unit 124 and extending between end members 125 and 126 for supporting a plurality of longitudinally spaced upright shafts 127 mounted on the cover member 123 and upstanding therefrom.

A spinner base member 128 is mounted on each of the upright shafts 127 and suitable means are mounted thereon for rotatably supporting each spinner base member 128 on the respective upright shaft 127, as by a plurality of suitable roller or pin bearings 129.

The spinners 121 may be any desired shape, such as flat, triangular, rectangular and the like, however, it has been found that a triangular shaped spinner is the preferred shape for displaying generally flat articles, such as greeting cards and the like.

A plurality of upright support members 130 extend upwardly from each of the spinner base members 128 and are circumferentially spaced in a circular pattern having the center thereof coinciding with the access of rotation of the respective spinner base member 128 and shaft 127. The upright support members 130 each have opposed side portions at each edge thereof to form a recess to receive opposite ends of a plurality of vertically spaced merchandise supporting members in the form of the pockets 122 which extend between adjacent upright support members 130 and have opposite ends thereof supported on facing surfaces of respective adjacent upright support members 130.

In the illustrated structure, the merchandise supporting members or pockets 122 each have facing front and rear portions 131 and 132 respectively joined together at a lower edge 133 to form a pocket to receive generally flat articles of merchandise. It is preferably that the merchandise supporting members or pockets be formed of a transparent material, such as clear plastic, to thereby display the article of merchandise in full view.

The merchandise supporting members or pockets 122 may be supported on the upright support members 130 in any suitable manner, however, in the disclosed embodiment, a lip 134 is formed on an exterior surface of the rear portion 132 and extends outwardly therefrom to have opposite end portions thereof received within suitable recesses 135 in facing surfaces of adjacent upright support members 130.

It is desirable to provide means on each of the spinners 121 to designate the nature of the articles of merchandise in the merchandise supporting members or pockets 122 supported thereon. In the illustrated structure, closure panels 136 extend between the upright support members 130 and are spaced from the merchandise supporting members or pockets 122. The closure panels 136 may be color coded or have a distinctive finish, such as a veneer having a pattern simulating wood grain, marble, or the like. Extensions 137 are mounted on and extend upwardly from the upright support members 130 and have portions thereof at opposite edges to receive and support opposite ends of signing members 138 extending therebetween which may also be color coded or have a distinctive finish to cooperate with the closure panels 136 and suitable wording on the signing members 138 to thereby designate the nature of the articles of merchandise in the merchandise supporting members or pockets 122, such as birthday cards, get well cards, anniversary cards, special occasion cards, graduation cards, booklets, and like generally flat articles.

Figure 14:
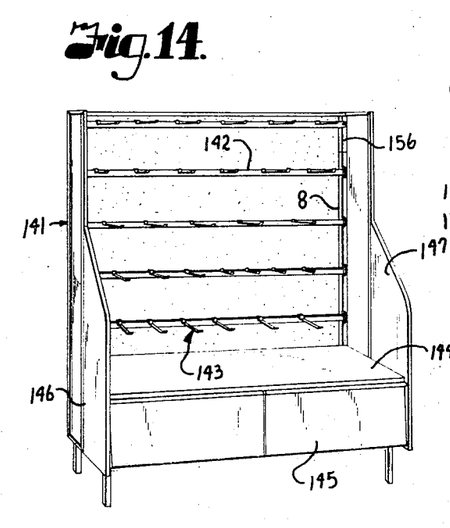
FIG. 14 is a perspective view of an additional modified merchandise display unit having a plurality of vertically spaced bars with display members thereon.
Figure 15:
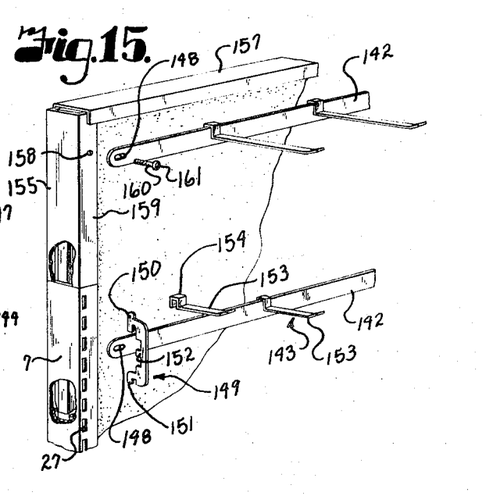
FIG. 15 is an enlarged fragmentary exploded perspective view of a bar and a bracket for supporting the bar on the display unit.

FIGS. 14 and 15 illustrate an additional modified merchandise display unit 141 having a plurality of vertically spaced bars 142 each having display members 143 mounted thereon. The additional modified merchandise display unit 141 includes a generally planar cover member 144 above a merchandise storage unit 145 and extending between end members 146 and 147.

The bars 142 extend between the upright standards 7 and 8 and have opposite ends thereof engaging exposed surfaces of the standards for support thereon. In the illustrated embodiment, the opposite ends of the bars each have slots or apertures 148 therein which are selectively alignable with selected slots 27 in the flange portions of the standards 7 and 8 for receiving portions, as later described, of a mounting member 149 for supporting each end of the bars 142.

Each mounting member 149 is illustrated as a generally C-shaped member having a pair of vertically spaced hooks 150 and 151 adapted to extend through respective slots 27 in respective upright standards 7 and 8 for removably mounting the mounting member 149 on the respective standards. Each mounting member 149 has a tab 152 positioned between the hooks 150 and 151 and adapted to extend through the slot or aperture 148 in the ends of the bars 142 and a slot 27 between the slots receiving the hooks 150 and 151.

The illustrated display members 143 are each adapted to be mounted on one of the bars 142 and each has a merchandise supporting portion 153 extending outwardly from the respective bar 42 to support articles of merchandise thereon. Each display member 143 has a generally inverted U-shaped mounting portion 154 adapted to engage an upper edge of one of the bars 142 and be retained thereon with the merchandise supporting portion 153 extending outwardly therefrom.

The additional modified merchandise display unit 141 is illustrated as including an upward extension formed of extension standards 155 and 156 mounted in upper ends of the standards 7 and 8 respectively and extending upwardly therefrom similar to the extension standards 72 and 73 for supporting one or more of the bars 142. The upward extension includes a top cap 157 mounted on and extending between upper ends of the extension standards 155 and 56 in a manner similar to the top cap 83.

In the illustrated structure, the extension standards 155 and 156 each have at least one threaded recess or bore 158 in a flange portion 159 thereof to receive a suitable fastening member, such as a bolt or screw 160, extending through the slot or aperture 148 in the respective ends of the bars 142 and received within the threaded recess or bore 158 for holding the respective ends of the bar in clamped engagement between a head portion 161 of the bolt or screw 160 and the flange portion 159 of the respective extension standard.

Figure 16:
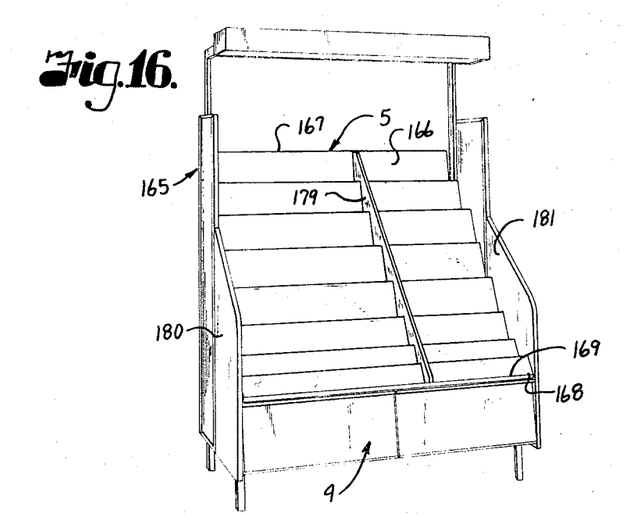
FIG. 16 is a perspective view of an additional further modified merchandise display unit having vertically stepped compartments.
Figure 17:
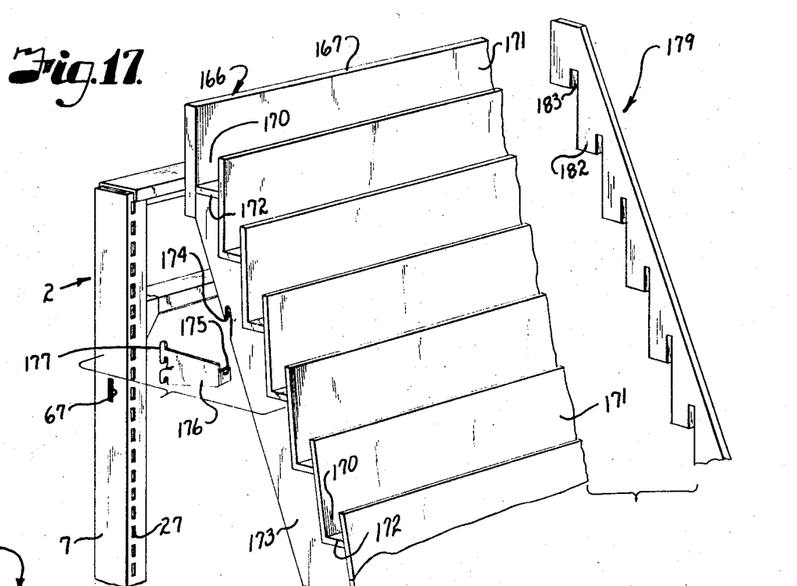
FIG. 17 is an enlarged fragmentary exploded perspective view of members mounting the stepped compartments on the display unit.

FIGS. 16 and 17 illustrate an additional further modified merchandise display unit 165 having the merchandise display means 5 in the form of a sloping display panel 166 having an upper edge portion 167 thereof supportingly engaging the back frame 2, as later described, and a lower edge portion 168 engaging a forward portion of a cover member 169 positioned above a merchandise storage unit 4 supported on the base frame 3.

The illustrated sloping display panel 166 has a plurality of vertically stepped merchandise receiving compartments 170 formed by a plurality of suitably connected generally L-shaped members each having a back portion 171 extending generally vertically and a base portion 172 extending generally horizontally and normal to the back portion 171. Each base portion 172 engages a back portion 171 of an adjacent compartment 170 intermediate upper and lower edges of the back portion 171 thereof whereby the compartments 170 are vertically stepped and the portion of each back portion 171 above the base portion 172 intersecting a rear side thereof forms a wall portion for retaining articles of merchandise within the respective compartments, such as books, greeting cards, wrapping paper, candles, and the like.

The illustrated sloping display panel 166 has a depending flange or edge wall 173 at each opposite side edge thereof. Each flange or edge wall 173 extends between the upper and lower edge portions 167 and 168 of the sloping display panel 166 and has at least one and preferably a plurality of notches 174 formed therein to receive a flange or arm portion 175 of a support bracket 176 removably supported on the respective standards 7 and 8. Each support bracket 176 has a pair of hooks 177 each having hook portions 178 received in selected slots 27 in respective standards 7 and 8 to thereby support the upper portions of the sloping display panel 166 on the back frame 2.

It may be desirable to display articles having different characteristics, such as hooks and greeting cards, in the same display unit 165, therefore, at least one elongated divider member 179 is provided to extend between the upper edge portion 167 and the lower edge portion 168 of the sloping display panel 166 and positioned between spaced end members 180 and 181 at opposite ends of the display unit 165. The divider member 179 has depending portions 182 spaced therealong and sized to extend into each of the vertically stepped compartments 170 and engage surfaces of the back portions 171 and base portions 172 defining the respective compartments for mounting the divider member 179 in the sloping display panel 166 to separate articles of merchandise into selected groups. The divider member 179 also has a plurality of slots 183 each separating adjacent depending portions 182 with facing edges of adjacent depending portions 182 being spaced apart to receive respective back portions 171 therebetween and engage same to securely mount the divider member 179 in the sloping display panel 166.

Figure 18:
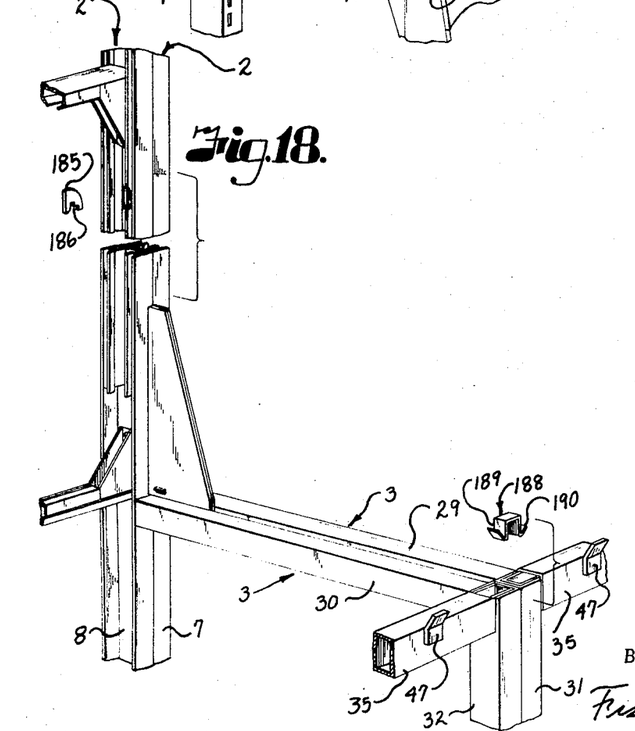
FIG. 18 is an enlarged fragmentary exploded perspective view of members for joining together merchandise display units in side-by-side relation.

FIG. 18 illustrates means for joining together adjacent back frames 2 and adjacent base frames 3 in side-by-side relation thereby joining various display units together in any desired arrangement to display various articles of merchandise.

In the illustrated structure, a locking key 185 is received within each of the slots 67 of of the respective adjacent standards of the adjacent back frames 2. The locking key 185 has a notch 186 in a lower edge thereof with the notch 186 being sized to receive therein the web portion 16 of each of the respective adjacent standards. One portion of the locking key 185 has an arcuate surface to thereby permit the locking key 185 to be moved into engagement with the web portions 16 of the respective standards.

The legs of adjacent base frames 3 are also joined together in side-by-side relation by means of an alignment clip 188 having spaced side portions 189 and 190 received within respective tubular end portions of support rails which are received within the respective tubular legs of the adjacent base frames 3 to thereby lock same together.

It is to be understood that while we have illustrated and described certain forms of our invention, it is not to be limited to these specific forms or arrangement of parts herein described and shown.

What we claim and desire to secure by Letters Patent is:

1. A merchandise display unit comprising:
   (a) a pair of substantially parallel upright standards;
   (b) a plurality of vertically spaced rails extending between facing surfaces of said standards to define a back frame;
   (c) an arm structure for each standard and having a leg depending from a free end of each arm;
   (d) means for removably mounting one end of said arm structure on said respective standard to extend generally forwardly therefrom;
   (e) a support rail extending between said arm structures;
   (f) means for removably mounting the ends of said support rail on respective arm structures, said support rail and legs and arms defining a base frame extending generally forwardly from the back frame;
   (g) a merchandise storage unit supported on the base frame; and
   (h) merchandise display means above said merchandise storage unit for displaying articles of merchandise, said merchandise display means having a plurality of removably mounted shelves arranged in vertically stepped relation.

2. A merchandise display unit as set forth in claim 1 wherein said merchandise display means include:
   (a) a closure panel extending between said upright standards and a pair of said rails in said back frame;
   (b) a generally planar cover member above said merchandise storage unit;
   (c) a sloping display panel having an upper end thereof supportingly engaging the back frame and a lower end thereof supportingly engaging a forward portion of said cover member;
   (d) a plurality of shelves each having a merchandise supporting portion; and
   (e) cooperating means on said display panel and said shelves for removably supporting same in vertically stepped relation and having said merchandise supporting portion extending substantially normal to said display panel.

3. A merchandise display unit as set forth in claim 2 wherein:
   (a) said display panel has a plurality of vertically aligned and spaced tabs arranged in a plurality of laterally spaced rows;
   (b) said tabs each have a portion substantially parallel with an exposed surface of said display panel;
   (c) said shelves each have a back portion extending substantially parallel with said display panel; and
   (d) said shelves each have hook portions thereon and positioned adjacent an upper edge of said back portion thereof to support same in vertically stepped relation on the display panel.

4. A merchandise display unit as set forth in claim 3 wherein:
   (a) said upright standards each have a plurality of vertically spaced slots in an exposed surface thereof;
   (b) said display panel has a depending flange at each opposite side thereof;
   (c) said flanges each have at least one notch formed therein;
   (d) a bracket for each upright standard has a plurality of vertically spaced hooks one end thereof and each adapted to extend through respective slots in the exposed surface of said respective standards:
   (e) said brackets each have a flange portion thereof to be received in the respective notch in the respective flange of said display panel to thereby support same on the back frame; and
   (f) said display panel has a lower edge thereof positioned in supporting engagement with said merchandise storage unit.

5. A merchandise display unit as set forth in claim 1 including:
   (a) an extension standard mounted on each of said upright standards and extending upwardly therefrom and aligned therewith;
   (b) a light support arm for each extension standard and haveing one end of said light support arm mounted adjacent an upper end of said respective extension standard to extend therefrom normal to the back frame; and
   (c) means extending between said light support arms and above the vertically stepped shelves for illuminating the articles of merchandise in said shelves.

6. A merchandise display unit as set forth in claim 1 wherein:
(a) said upright standards each have a plurality of vertically spaced slots in an exposed surface thereof;
(b) said arm mounting means includes a gusset mounted on the one end of each arm and having a plurality of vertically spaced hooks each adapted to extend through respective slots in respective upright standards; and
(c) said arm mounting means includes a pin below each gusset and resilient means urging the pin through one of said slots in the respective upright standard.

References Cited

UNITED STATES PATENTS

| | | | |
|---|---|---|---|
| 935,249 | 9/1909 | Doxtator | 312—123 |
| 2,710,241 | 6/1955 | Lieberman | 312—279 X |
| 2,955,715 | 10/1960 | Carlson | 312—279 UX |
| 3,270,891 | 9/1966 | Briggs | 312—278 X |
| 3,288,545 | 11/1966 | Benne | 312—290 X |
| 3,325,017 | 6/1967 | Tucker | 211—177 X |

JAMES C. MITCHELL, Primary Examiner

U.S. Cl. X.R.

312—125, 257, 278; 211—128